US011436454B2

United States Patent
Tashiro (10) Patent No.: US 11,436,454 B2
(45) Date of Patent: Sep. 6, 2022

(54) INSPECTION DEVICE, IMAGE FORMING APPARATUS, AND NON-TRANSITORY COMPUTER READABLE MEDIUM STORING INSPECTION PROGRAM

(71) Applicant: FUJIFILM Business Innovation Corp., Tokyo (JP)

(72) Inventor: Yosuke Tashiro, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/348,786

(22) Filed: Jun. 16, 2021

(65) Prior Publication Data

US 2022/0092371 A1 Mar. 24, 2022

(30) Foreign Application Priority Data

Sep. 18, 2020 (JP) .............................. JP2020-157924

(51) Int. Cl.
*G06K 15/02* (2006.01)
*G03G 15/00* (2006.01)

(52) U.S. Cl.
CPC ..... *G06K 15/1867* (2013.01); *G03G 15/5041* (2013.01)

(58) Field of Classification Search
CPC .................................................. G06K 15/1867
See application file for complete search history.

(56) References Cited

U.S. PATENT DOCUMENTS

| | | | |
|---|---|---|---|
| 2013/0301083 A1* | 11/2013 | Kaneda .............. | H04N 1/00005 358/406 |
| 2021/0118115 A1* | 4/2021 | Tsukamoto ............... | G06T 1/20 |
| 2021/0185181 A1* | 6/2021 | Tomii .................... | G06F 3/1229 |
| 2021/0264581 A1* | 8/2021 | Ishii ..................... | G06K 15/027 |
| 2021/0314450 A1* | 10/2021 | Genda ................ | H04N 1/00037 |
| 2021/0385337 A1* | 12/2021 | Takayama .......... | H04N 1/00068 |
| 2021/0389712 A1* | 12/2021 | Ueda .................. | G03G 15/5029 |
| 2022/0014633 A1* | 1/2022 | Miyagawa ......... | H04N 1/00005 |
| 2022/0028047 A1* | 1/2022 | Mashiko ............ | H04N 1/00045 |
| 2022/0067901 A1* | 3/2022 | Takahashi ............ | G06K 15/027 |
| 2022/0116504 A1* | 4/2022 | Tsukamoto ............. | G06T 7/001 |

FOREIGN PATENT DOCUMENTS

JP 6323190 5/2018

* cited by examiner

*Primary Examiner* — Ted W Barnes
(74) *Attorney, Agent, or Firm* — JCIPRNET (57) ABSTRACT

An inspection device includes a processor configured to use, as correct image data, read image data obtained by reading an image-formed matter obtained by forming original image data on a recording medium, and, in a case where a first inspection of determining quality of read image data as an inspection target is performed using the correct image data, the read image data being obtained by reading a new image-formed matter, perform a second inspection on a blank portion or a solid portion included in the read image data as the inspection target, the second inspection using the original image data as the correct image data.

17 Claims, 8 Drawing Sheets

INSPECTION DEVICE, IMAGE FORMING APPARATUS, AND NON-TRANSITORY COMPUTER READABLE MEDIUM STORING INSPECTION PROGRAM

CROSS-REFERENCE TO RELATED APPLICATIONS

This application is based on and claims priority under 35 USC 119 from Japanese Patent Application No. 2020-157924 filed Sep. 18, 2020.

BACKGROUND

(i) Technical Field

The present invention relates to an inspection device, an image forming apparatus, and a non-transitory computer readable medium storing an inspection program.

(ii) Related Art

For example, JP6323190B discloses an image forming apparatus having a function of inspecting an image. The image forming apparatus includes an image reading unit and a feature amount calculation unit. The image reading unit reads each of images formed on a plurality of pieces of paper. The feature amount calculation unit sets any of a plurality of images read by the image reading unit, as a reference image, and sets the others as inspection target images. The feature amount calculation unit detects one or each of a plurality of feature points in the reference image and the inspection target images and calculates the feature amount of each feature point. The image forming apparatus further includes a determination unit that determines the quality of the inspection target image by collating the feature amount of each feature point in the reference image, which are detected by the feature amount calculation unit, with the feature amount of each feature point in the inspection target image, which are detected by the feature amount calculation unit. The determination unit searches each feature point in the reference image and the inspection target image, which is used for collating the feature amount, for each search area centered on each pixel of the inspection target image. Then, the determination unit determines the size of the search area in accordance with the size of one object or a plurality of objects in the reference image.

SUMMARY

In a case where an inspection is performed using, as correct image data, any of a plurality of pieces of read image data obtained respectively by reading a plurality of image-formed matters, various noises (stain, dirt, dust, and the like) may be attached to a blank portion (background color portion of paper, on which an image is not formed) or a solid portion (portion on which an image of the same color including the halftone is formed) of the image-formed matter. In a case where read image data of the image-formed matter containing noise in the blank portion or the solid portion is used as the correct image data, the inspection accuracy may be affected.

For example, in a case where the read image data containing the above noise is used as the correct image data, in the subsequent inspection, read image data that contains noise and is to be originally failure may be determined to pass, and read image data that does not contain noise and is to originally pass may be determined to be failure. Therefore, for example, it is required to improve the inspection accuracy of the blank portion or the solid portion.

Aspects of non-limiting embodiments of the present disclosure relate to an inspection device, an image forming apparatus, and a non-transitory computer readable medium storing an inspection program capable of inspecting a blank portion or a solid portion with high accuracy in comparison to a case where an inspection is performed using, as correct image data, read image data obtained by reading an image-formed matter.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an inspection device including a processor configured to use, as correct image data, read image data obtained by reading an image-formed matter obtained by forming original image data on a recording medium, and, in a case where a first inspection of determining quality of read image data as an inspection target is performed using the correct image data, the read image data being obtained by reading a new image-formed matter, perform a second inspection on a blank portion or a solid portion included in the read image data as the inspection target, the second inspection using the original image data as the correct image data.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments for carrying out the technique of the present disclosure will be described in detail with reference to the drawings.

First Exemplary Embodiment

Figure 1:
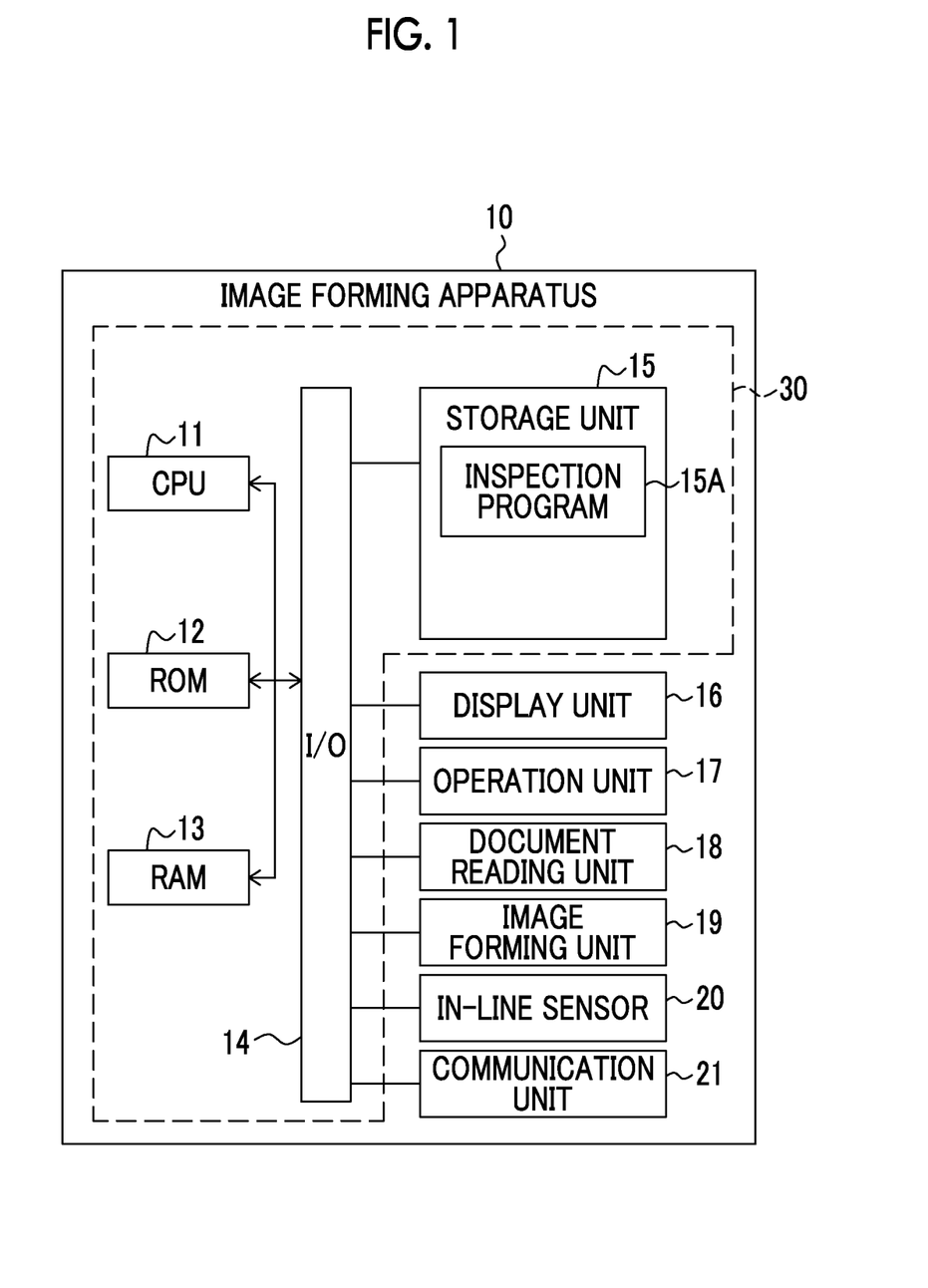
FIG. 1 is a block diagram illustrating an example of an electrical configuration of an image forming apparatus according to a first exemplary embodiment.

FIG. 1 is a block diagram illustrating an example of an electrical configuration of an image forming apparatus 10 according to a first exemplary embodiment.

As illustrated in FIG. 1, according to the exemplary embodiment, the image forming apparatus 10 includes an inspection device 30, a display unit 16, an operation unit 17, a document reading unit 18, an image forming unit 19, an in-line sensor 20, and a communication unit 21. The image forming unit 19 is an example of a forming unit. The in-line sensor 20 is an example of a reading unit.

The inspection device 30 includes a central processing unit (CPU) 11, a read only memory (ROM) 12, a random access memory (RAM) 13, an input/output interface (I/O) 14, and a storage unit 15. In the exemplary embodiment, the image forming apparatus 10 and the inspection device 30 are integrally provided, but the present disclosure is not limited to this. The image forming apparatus 10 and the inspection device 30 may be provided separately.

The units of the CPU 11, the ROM 12, the RAM 13, and the I/O 14 are connected to each other via a bus. Functional units including the storage unit 15, the display unit 16, the operation unit 17, the document reading unit 18, the image forming unit 19, the in-line sensor 20, and the communication unit 21 are connected to the I/O 14. Each of the functional units may communicate with the CPU 11 via the I/O 14.

A control unit is configured by the CPU 11, the ROM 12, the RAM 13, and the I/O 14. The control unit may be configured as a sub-control unit that controls an operation of a portion of the image forming apparatus 10, or may be configured as a portion of a main control unit that controls the entire operation of the image forming apparatus 10. For example, an integrated circuit such as a large scale integration (LSI) or an integrated circuit (IC) chipset is used for some or all of blocks of the control unit. An individual circuit may be used for each of the above blocks, or a circuit in which some or all of the blocks are integrated may be used. The above blocks may be provided integrally, or some blocks may be provided separately. A portion of each of the above blocks may be provided separately. The integration of the control unit is not limited to the LSI, and a dedicated circuit or a general-purpose processor may be used.

As the storage unit 15, for example, a hard disk drive (HDD), a solid state drive (SSD), or a flash memory is used. The storage unit 15 stores an inspection program 15A for executing inspection processing according to the exemplary embodiment. The inspection program 15A may be stored in the ROM 12.

The inspection program 15A may be installed in advance in the image forming apparatus 10, for example. The inspection program 15A may be realized in a manner that the inspection program is stored in a non-volatile storage medium or distributed via a network, and is appropriately installed in the image forming apparatus 10. Examples of the non-volatile storage medium include a compact disc read only memory (CD-ROM), a magneto-optical disk, an HDD, a digital versatile disc read only memory (DVD-ROM), a flash memory, and a memory card.

For example, a liquid crystal display (LCD) or an organic electro-luminescence (EL) display is used for the display unit 16. The display unit 16 may integrally include a touch panel. Various operation keys such as a numeric keypad and a start key are provided in the operation unit 17. The display unit 16 and the operation unit 17 receive various instructions from a user of the image forming apparatus 10. The various instructions include, for example, an instruction to start reading a document, and an instruction to start copying the document. The display unit 16 displays various types of information such as the result of processing executed in accordance with the instruction received from the user and the notification in response to the processing.

The document reading unit 18 takes documents placed on a paper feed tray of an automatic document feeder (not illustrated) provided on the upper portion of the image forming apparatus 10 one by one, and optically reads the taken document to obtain image information. Alternatively, the document reading unit 18 optically reads a document placed on a document stand such as platen glass to obtain image information.

The image forming unit 19 forms, on a recording medium such as paper, an image based on image information obtained by reading of the document reading unit 18 or image information obtained from an external personal computer (PC) connected via the network. In the exemplary embodiment, an electrophotographic method will be described as an example of a method of forming an image, but another method such as an inkjet method may be adopted.

In a case where the method of forming an image is an electrophotographic method, the image forming unit 19 includes a photoconductor drum, a charging unit, an exposing unit, a developing unit, a transfer unit, and a fixing unit. The charging unit applies a voltage to the photoconductor drum to charge the surface of the photoconductor drum. The exposing unit exposes the photoconductor drum charged by the charging unit with light corresponding to image information, so as to form an electrostatic latent image on the photoconductor drum. The developing unit develops the electrostatic latent image formed on the photoconductor drum with a toner to form a toner image on the photoconductor drum. The transfer unit transfers the toner image formed on the photoconductor drum to a recording medium. The fixing unit fixes the toner image transferred to the recording medium by heating and pressurizing.

The in-line sensor 20 reads an image formed on a recording medium by the image forming unit 19.

The communication unit 21 is connected to a network such as the Internet, a local area network (LAN), and a wide area network (WAN), and can communicate with an external PC or the like via the network.

Next, an image reading structure using the in-line sensor 20 will be described with reference to FIGS. 2A and 2B.

Figure 2A:
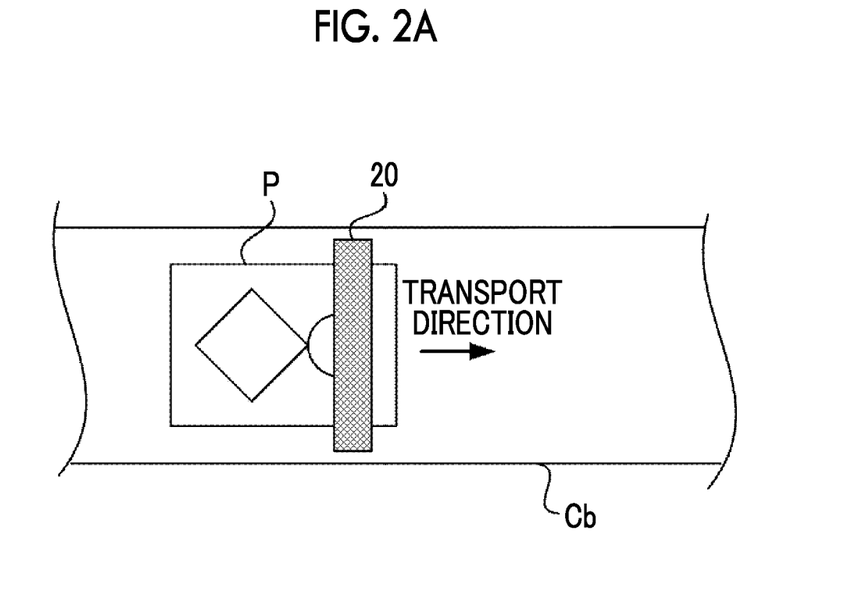
FIG. 2A is a top view illustrating an example of an image reading structure using an in-line sensor according to the first exemplary embodiment.

FIG. 2A is a top view illustrating an example of the image reading structure using the in-line sensor 20 according to the exemplary embodiment. FIG. 2B is a side view illustrating the example of the image reading structure using the in-line sensor 20 according to the exemplary embodiment.

Figure 2B:
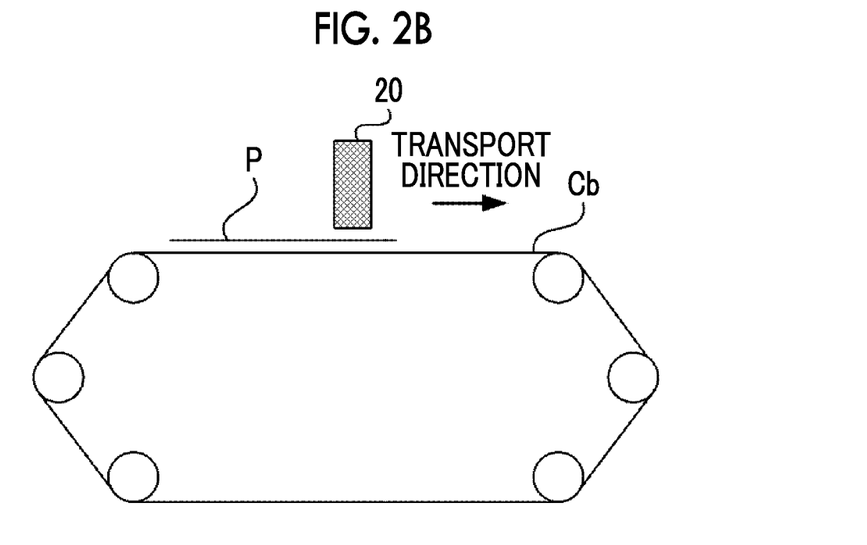
FIG. 2B is a side view illustrating the example of the image reading structure using the in-line sensor according to the first exemplary embodiment.

As illustrated in FIGS. 2A and 2B, the in-line sensor 20 reads an image formed on a recording medium P such as paper. The in-line sensor is provided, for example, over a transport belt Cb for transporting the recording medium P between the above-described fixing unit and an exit tray (not illustrated). For example, sensors such as a charge coupled device (CCD) and a complementary metal oxide semiconductor (CMOS) are used for the in-line sensor 20. In the in-line sensor 20, in a case where light is emitted from a light source, reflected light from the recording medium P is imaged on a light receiving unit through a light receiving lens, and is converted into an electrical signal in accordance with the amount of the reflected light by the light receiving unit. Thus, measurement data is output. The in-line sensor 20 sequentially acquires the measurement data for each line of the recording medium P by moving the recording medium P in a transport direction. At a time point at which the entirety of the recording medium P passes, the in-line sensor 20 acquires read image data corresponding to one surface of the recording medium P. The acquired read image data is stored in the storage unit 15.

According to the exemplary embodiment, the image forming apparatus 10 has a function of performing a first inspection and a second inspection of inspecting an image-formed matter.

In the first inspection, read image data obtained by reading the image-formed matter obtained by forming the original image data on a recording medium is used as the correct image data, and read image data obtained by reading a new image-formed matter is set as the inspection target. In the first inspection, the correct image data being the read image data is collated with the read image data as the inspection target, and the quality of the read image data as the inspection target is determined. The correct image data may be selected from a plurality of pieces of read image data, and a plurality of pieces of read image data may be set as the inspection target. The original image data is image data that is the basis of an image to be image-formed (printed). For example, data (rasterized data) after raster image processor (RIP) processing, bitmap data, and graphics interchange format (GIF) data are applied.

In the first inspection, for example, pieces of read image data obtained by reading an image-formed matter obtained by forming original image data on some recording media are displayed as candidates for correct image data. The read image data selected from the pieces of read image data by the user is used as the correct image data, and read image data of an image-formed matter newly obtained after that is set as the inspection target.

The second inspection is an inspection in which original image data is used as correct image data, and the read image data obtained by reading the image-formed matter obtained by forming the original image data on a recording medium is set as an inspection target. In the second inspection, the correct image data being the original image data is collated with the read image data as the inspection target, and the quality of the read image data as the inspection target is determined. Similar to the first inspection, a plurality of pieces of read image data may be set as the inspection target.

Next, the first inspection and the second inspection according to the exemplary embodiment will be specifically described with reference to FIG. 3.

Figure 3:
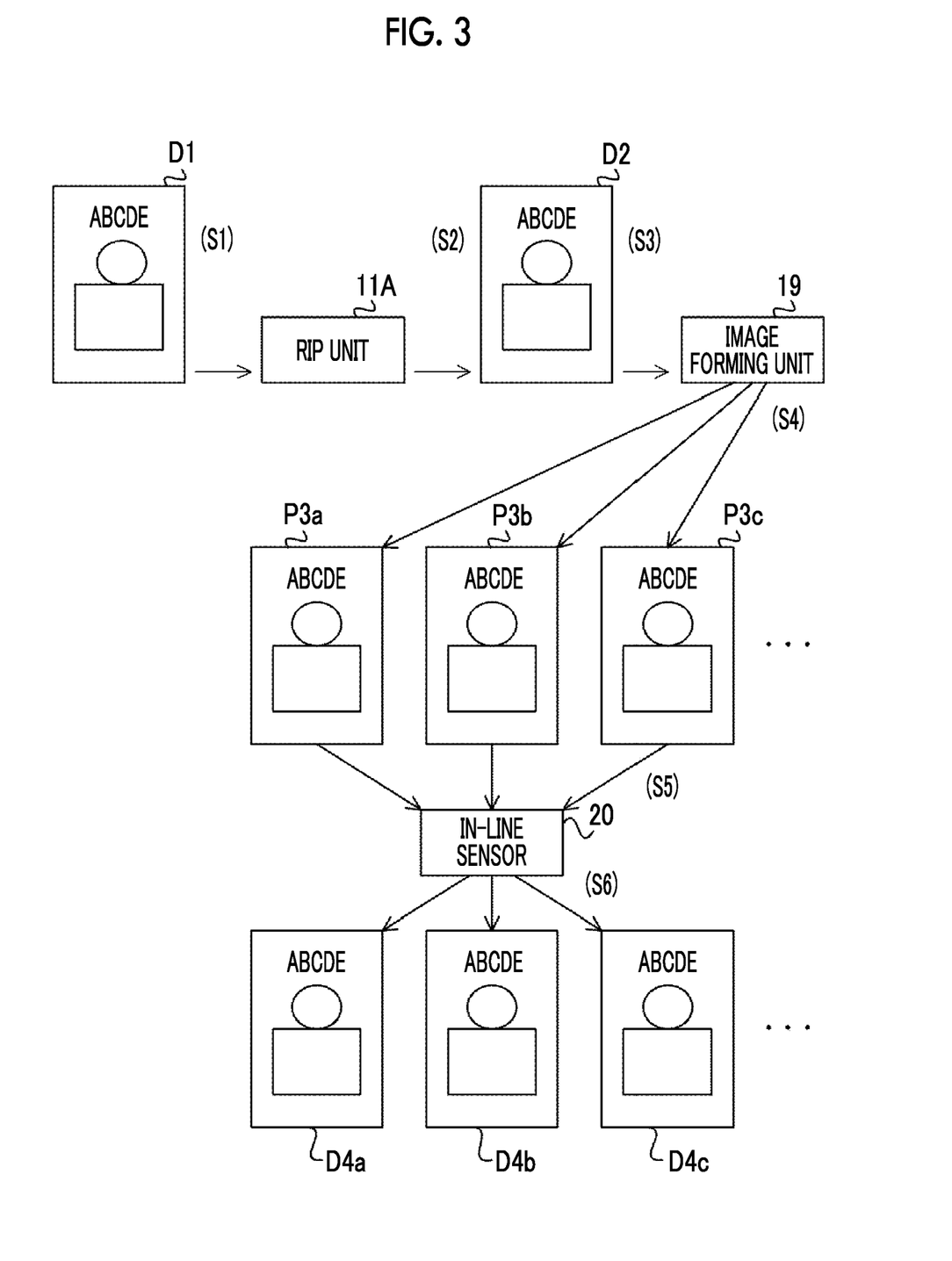
FIG. 3 is a diagram illustrating a first inspection and a second inspection according to the first exemplary embodiment.

FIG. 3 is a diagram illustrating the first inspection and the second inspection according to the exemplary embodiment.

Firstly, the second inspection using original image data as the correct image data will be described.

In (S1) of FIG. 3, a RIP unit 11A receives an input of image data D1 described in the page description language (PDL) as an example. Examples of the PDL include PRINTER CONTROL LANGUAGE (PCL, registered trademark) and POST SCRIPT (PS, registered trademark). The RIP unit 11A executes RIP processing, and a specific description will be made later.

In (S2), the RIP unit 11A executes the RIP processing on the image data D1 of which the input is received, and outputs original image data D2. In the second inspection, the original image data D2 is used as correct image data.

In (S3), the image forming unit 19 receives the input of the original image data D2.

In (S4), the image forming unit 19 forms the original image data D2 of which the input is received, for example, on a plurality of recording media, and outputs a plurality of image-formed matters P3a to P3c.

In (S5), as an example, as illustrated in FIGS. 2A and 2B described above, the in-line sensor 20 reads each of the plurality of image-formed matters P3a to P3c transported on the transport belt Cb.

In (S6), the in-line sensor 20 outputs a plurality of pieces of read image data D4a to D4c obtained by reading the plurality of image-formed matters P3a to P3c, respectively. In the second inspection, the plurality of pieces of read image data D4a to D4c are set as the inspection target.

In the second inspection, the correct image data being the original image data D2 is collated with each of the plurality of pieces of read image data D4a to D4c as the inspection target, and the quality of each of the plurality of pieces of read image data D4a to D4c is determined.

Next, the first inspection in which the read image data obtained by reading the image-formed matter is used as the correct image data will be described.

In FIG. 3, the processes of (S1) to (S6) are similar. However, in the first inspection, for example, the read image data D4a is used as the correct image data, and new read image data D4b and D4c output after the read image data D4a are set as the inspection target. In the first inspection, the correct image data being the read image data D4a is collated with each of the pieces of new read image data D4b and D4c as the inspection target, and the quality of each of the pieces of new read image data D4b and D4c is determined.

Here, in the first inspection, since the read image data is used as the correct image data, it is considered that the states (for example, size and line thickness) of the images to be collated are substantially identical to the states in the second inspection. Therefore, it is easier to perform the first inspection than to perform the second inspection. On the other hand, as described above, for example, in a case where read image data of an image-formed matter containing noise in a blank portion or a solid portion is used as the correct image data, in the subsequent inspection, read image data that contains noise and is to be originally failure may be determined to pass, and read image data that does not contain noise and is to originally pass may be determined to be failure. Therefore, for example, it is required to improve the inspection accuracy of the blank portion or the solid portion.

In the image forming apparatus 10 according to the present exemplary embodiment, in a case where the first inspection using, as the correct image data, read image data obtained by reading an image-formed matter including a blank portion or a solid portion is performed, regarding the blank portion or the solid portion of the read image data as the inspection target, the second inspection using the original image data as the correct image data is performed. Thus, the inspection accuracy of the blank portion or the solid portion is improved. As described above, the blank portion indicates the background color portion of paper, on which an image is not formed. The solid portion indicates a portion on which an image of the same color including the halftone is formed.

Figure 4:
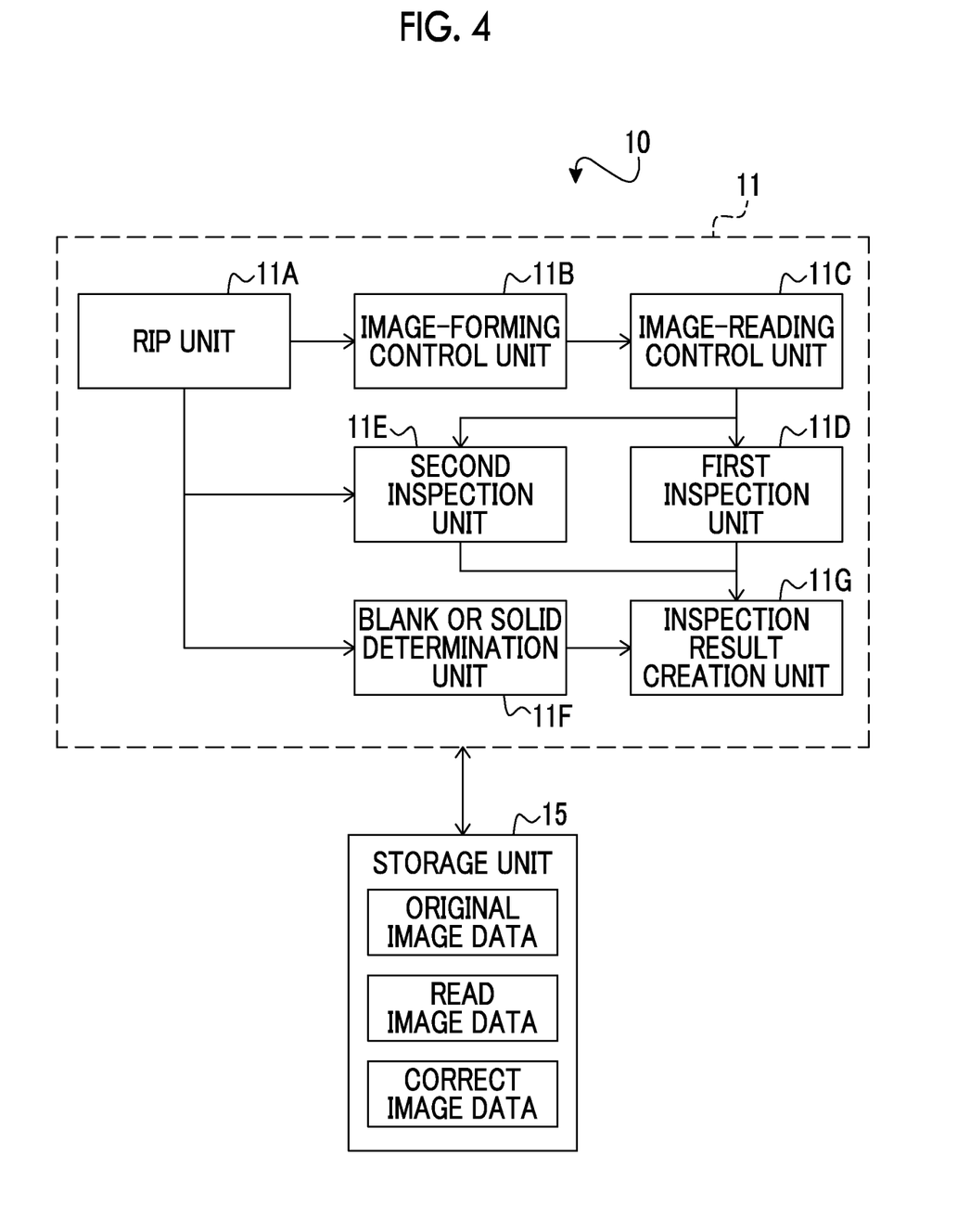
FIG. 4 is a block diagram illustrating an example of a functional configuration of the image forming apparatus according to the first exemplary embodiment.

Specifically, the CPU 11 in the image forming apparatus 10 according to the first exemplary embodiment writes the inspection program 15A stored in the storage unit 15 into the RAM 13, and executes the inspection program to function as the units illustrated in FIG. 4.

FIG. 4 is a block diagram illustrating an example of a functional configuration of the image forming apparatus 10 according to the first exemplary embodiment.

As illustrated in FIG. 4, the CPU 11 in the image forming apparatus 10 according to the present exemplary embodiment functions as the RIP unit 11A, an image-forming control unit 11B, an image-reading control unit 11C, a first inspection unit 11D, a second inspection unit 11E, and a blank or solid determination unit 11F, and an inspection result creation unit 11G.

As an example, the RIP unit 11A interprets the input image data described in the PDL to generate intermediate data, performs color conversion on the generated intermediate data, and performs rendering to generate original image data. As described above, the original image data may be, for example, rasterized data, bitmap data, or GIF data. The original image data generated by the RIP unit 11A is registered in the storage unit 15. In the above-described example in FIG. 3, the original image data corresponds to the original image data D2.

The image-forming control unit 11B controls the operation of the image forming unit 19. The image forming unit 19 forms the original image data registered in the storage unit 15 on a recording medium based on a control signal from the image-forming control unit 11B, and outputs an image-formed matter.

The image-reading control unit 11C controls the operation of the in-line sensor 20. The in-line sensor 20 reads the image-formed matter output from the image forming unit 19 based on a control signal from the image-reading control unit 11C, and outputs read image data. The read image data output from the in-line sensor 20 is registered in the storage unit 15. In the above-described example in FIG. 3, the read image data corresponds to the pieces of read image data D4a to D4c.

The first inspection unit 11D performs the first inspection. Specifically, the first inspection unit 11D uses the read image data registered in the storage unit 15 as the correct image data, and determines the quality of read image data obtained by reading a new image-formed matter, as the inspection target, by using the correct image data. That is, the first inspection unit collates the correct image data being the read image data with the read image data as the inspection target, and determines the quality of the collated read image data. In the above-described example in FIG. 3, the correct image data corresponds to, for example, the first read image data D4a, and the read image data as the inspection target corresponds to the pieces of read image data D4b and D4c. Since the read image data D4a is the correct image data, the read image data D4a is not the inspection target. However, the inspection result corresponding to the inspection result of the second inspection is set to "favorable".

The second inspection unit 11E performs the second inspection. Specifically, the second inspection unit 11E uses the original image data registered in the storage unit 15 as the correct image data, and determines the quality of the read image data as the inspection target by using the correct image data. That is, the second inspection unit collates the correct image data being the original image data with the read image data as the inspection target, and determines the quality of the collated read image data. In the above-described example in FIG. 3, the read image data as the inspection target corresponds to the pieces of read image data D4a to D4c.

That is, in the present exemplary embodiment, both the first inspection and the second inspection are performed on all pieces of the read image data set as the inspection target by the first inspection unit 11D and the second inspection unit 11E.

The blank or solid determination unit 11F analyzes the original image data to generate image structure information, and determines whether or not the original image data includes a blank portion or a solid portion, by using the generated image structure information. In the image structure information, the characteristics of each object such as a blank portion, a solid portion, and a text portion are defined. Since the image structure information is generated by using a known method, a specific description thereof will be omitted here. In a case where the blank portion or the solid portion is determined, it is highly likely to determine a predetermined number of pixels or a predetermined number of regions located at an edge (edge portion) of each object forming the original image data to be blank or solid. Therefore, it may be required not to determine such a predetermined number of pixels or predetermined number of regions to be blank or solid.

The inspection result of the first inspection and the inspection result of the second inspection on the read image data as the inspection target are input to the inspection result creation unit 11G. The inspection result creation unit 11G determines the quality of the blank portion or the solid portion included in the read image data as the inspection target by using the inspection result of the second inspection. The inspection result creation unit determines the quality of the portion (for example, text portion) other than the blank portion and the solid portion by using the inspection result of the first inspection. The inspection result creation unit 11G creates a final inspection result based on the determination results and outputs the created inspection result.

Specifically, the inspection result creation unit 11G associates the blank portion or the solid portion of the original image data used as the correct image data for the second inspection with the blank portion or the solid portion of the read image data as the inspection target, by using the image structure information input from the blank or solid determination unit 11F. This makes it possible to specify the blank portion or the solid portion of the read image data as the inspection target. The inspection result of the second inspection is adopted for the determination of the quality of the specified blank portion or solid portion. The inspection result of the first inspection is adopted for the determination of the portion other than the blank portion and the solid portion. That is, both the first inspection and the second inspection are performed on the read image data being the inspection target, and the inspection results are sorted in accordance with whether or not the portion is the blank portion or the solid portion.

Specifically, in a case where, regarding the blank portion or the solid portion, the inspection result of the first inspection is "poor" and the inspection result of the second inspection is "favorable", "favorable" being the inspection result of the second inspection is adopted as the determination result for the blank portion or the solid portion. In a case where the inspection result of the first inspection is "favorable" and the inspection result of the second inspection is "favorable", "favorable" being the inspection result of the second inspection is adopted as the determination result for the blank portion or the solid portion. In a case where the inspection result of the first inspection is "poor" and the inspection result of the second inspection is "poor", "poor" being the inspection result of the second inspection is adopted as the determination result for the blank portion or the solid portion. In a case where the inspection result of the first inspection is "favorable" and the inspection result of the second inspection is "poor", "poor" being the inspection result of the second inspection is adopted as the determination result for the blank portion or the solid portion.

In a case where, regarding a text portion as an example of the portion other than the blank portion and the solid portion, the inspection result of the first inspection is "poor" and the inspection result of the second inspection is "favorable", "poor" being the inspection result of the first inspection is adopted as the determination result for the text portion. In a case where the inspection result of the first inspection is "favorable" and the inspection result of the second inspection is "favorable", "favorable" being the inspection result of the first inspection is adopted as the determination result for the text portion. In a case where the inspection result of the first inspection is "poor" and the inspection result of the second inspection is "poor", "poor" being the inspection result of the first inspection is adopted as the determination result for the text portion. In a case where the inspection result of the first inspection is "favorable" and the inspection result of the second inspection is "poor", "favorable" being the inspection result of the first inspection is adopted as the determination result for the text portion.

The inspection result creation unit 11G performs a control of displaying the final inspection result for the read image data of the inspection target, on the display unit 16. Specifically, in a case where the result obtained by determining the quality of the blank portion or the solid portion is identical to the result obtained by determining the quality of the portion other than the contour blank portion and the solid portion, the inspection result creation unit 11G performs a control of displaying the identical determination result as the inspection result for the read image data as the inspection target. In a case where the result obtained by determining the quality of the blank portion or the solid portion is different from the result obtained by determining the quality of the portion other than the blank portion and the solid portion, as illustrated in FIG. 5, the inspection result creation unit 11G performs a control of displaying the different determination results as the inspection result for the read image data as the inspection target, and displaying a screen for receiving whether or not the user accepts the results.

Figure 5:
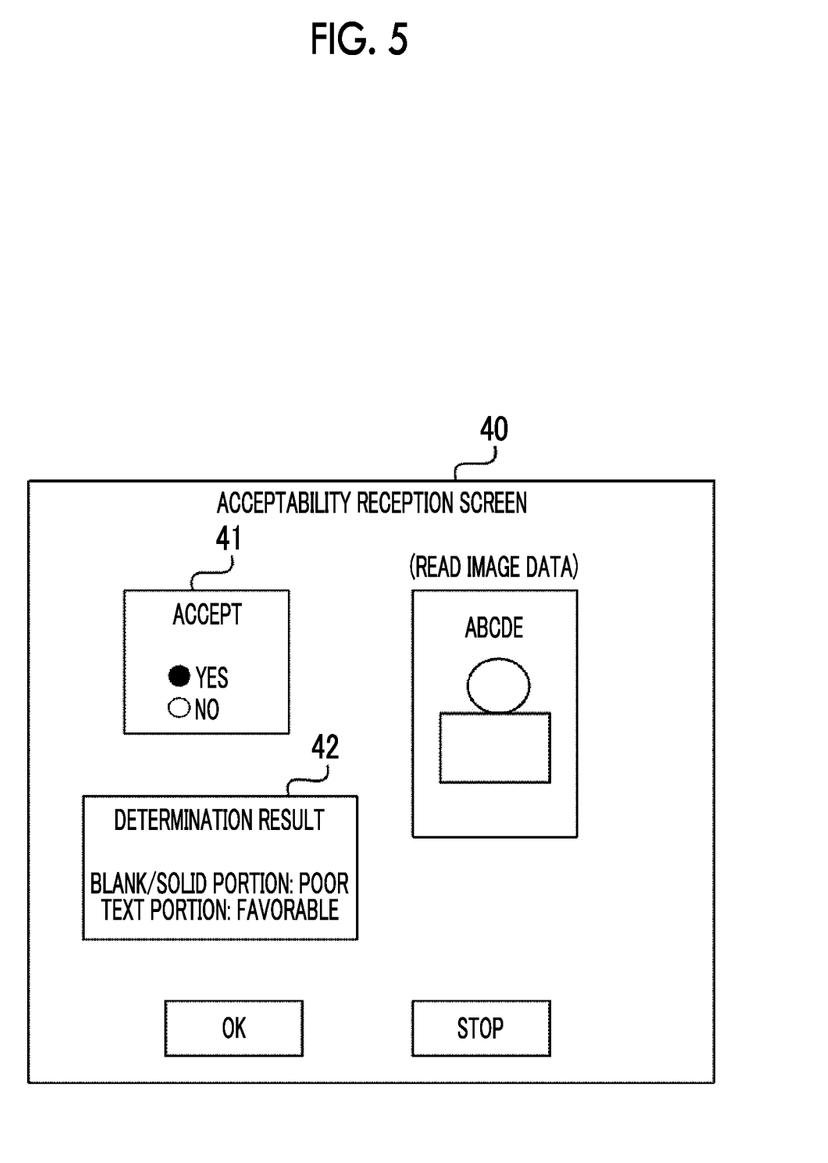
FIG. 5 is a front view illustrating an example of an acceptability reception screen according to the first exemplary embodiment.

FIG. 5 is a front view illustrating an example of an acceptability reception screen 40 according to the present exemplary embodiment.

On the acceptability reception screen 40 illustrated in FIG. 5, the read image data as the inspection target is displayed, and an acceptance selection field 41 and a determination result 42 are displayed. In the determination result 42, the result obtained by determining the quality of the blank portion or the solid portion and the result obtained by determining the quality of the text portion are displayed. "Yes" and "No" are displayed in the acceptance selection field 41 so as to be selectable. In a case where the user looks at the determination result 42 and the read image data, and accepts the determination result, the user selects "Yes". In a case where it is not possible for the user to accept the determination result, the user selects "No". Then, in a case where the user operates an "OK" button, the selection is applied as the final inspection result.

Next, the action of the image forming apparatus 10 according to the first exemplary embodiment will be described with reference to FIG. 6.

Figure 6:
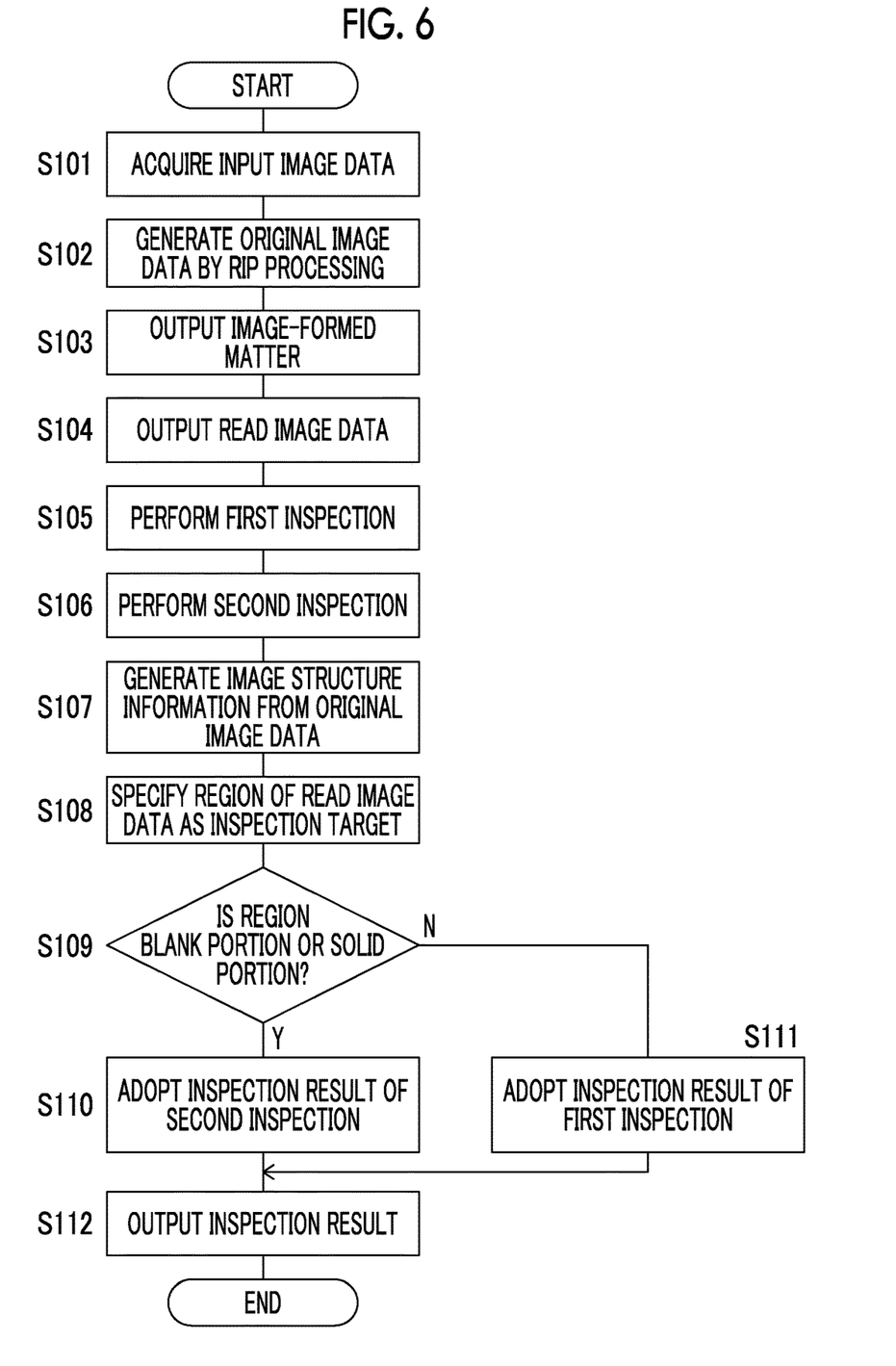
FIG. 6 is a flowchart illustrating an example of a processing flow by an inspection program according to the first exemplary embodiment.

FIG. 6 is a flowchart illustrating an example of a processing flow by the inspection program 15A according to the first exemplary embodiment.

Firstly, in a case where the image forming apparatus 10 is instructed to perform the inspection, the inspection program 15A is started to perform each of the following steps.

In Step S101 in FIG. 6, the CPU 11 acquires input image data from the document reading unit 18 or an external PC.

In Step S102, the CPU 11 performs RIP processing on the input image data acquired in Step S101 to generate original image data. The generated original image data is registered in the storage unit 15. As described above, for example, data (rasterized data) after the RIP processing, bitmap data, and GIF data are applied as the original image data.

In Step S103, the CPU 11 transmits a control signal to the image forming unit 19, and controls the operation of the image forming unit 19 to form the original image data registered in Step S102 on a recording medium and output an image-formed matter. A plurality of recording media may be used, and a plurality of image-formed matters may be output.

In Step S104, the CPU 11 transmits a control signal to the in-line sensor 20, and controls the operation of the in-line sensor 20 to read the image-formed matter output in Step S103, and output the read image data. In a case where a plurality of image-formed matters are provided, a plurality of pieces of read image data are output.

In Step S105, for example, the CPU 11 uses the first read image data as the correct image data, sets the subsequent read image data as the inspection target, and performs the first inspection on all pieces of the read image data set as the inspection target.

In Step S106, the CPU 11 uses the original image data as the correct image data, and performs the second inspection on all pieces of the read image data set as the inspection target, similar to the first inspection.

In Step S107, the CPU 11 generates image structure information from the original image data. At this time, the CPU associates the blank portion or the solid portion of the original image data used as the correct image data with the blank portion or the solid portion of the read image data as the inspection target, by using the generated image structure information.

In Step S108, the CPU 11 specifies a region of the read image data being the inspection target.

In Step S109, the CPU 11 determines whether or not the region specified in Step S108 is the blank portion or the solid portion. In a case where the CPU determines that the specified region is the blank portion or the solid portion (in the case of affirmative determination), the process proceeds to Step S110. In a case where the CPU determines that the specified region is neither the blank portion nor the solid portion, that is, a portion other than the blank portion and the solid portion (in the case of negative determination), the process proceeds to Step S111.

In Step S110, the CPU 11 adopts the inspection result of the second inspection for the blank portion or the solid portion determined in Step S109.

In Step S111, the CPU 11 adopts the inspection result of the first inspection for the portion other than the blank portion and the solid portion determined in Step S109.

In Step S112, the CPU 11 outputs the final inspection result for the read image data being the inspection target, based on the inspection result of the second inspection adopted in Step S110 and the inspection result of the first inspection adopted in Step S111. Then, the CPU ends a series of processes by the inspection program 15A.

As described above, according to the present exemplary embodiment, both the first inspection and the second inspection are performed on all pieces of read image data being the inspection target. Then, the inspection result of the second inspection is adopted for the blank portion or the solid portion of the read image data. The inspection result of the first inspection is adopted for the portion other than the blank portion and the solid portion. Therefore, it is intended to improve the inspection accuracy of the blank portion or the solid portion.

Second Exemplary Embodiment

In the first exemplary embodiment, a form in which, in a case where the first inspection is performed, both the first inspection and the second inspection are performed on all pieces of read image data being the inspection target. Then, the inspection result of the second inspection is adopted for the blank portion or the solid portion, and the inspection result of the first inspection is adopted for the portion other than the blank portion and the solid portion is described. In a second exemplary embodiment, a form in which the second inspection is performed on the blank portion or the solid portion of read image data being the inspection target, and the first inspection is performed on the portion other than the blank portion and the solid portion, and thus the two inspections do not overlap for each region will be described.

Figure 7:
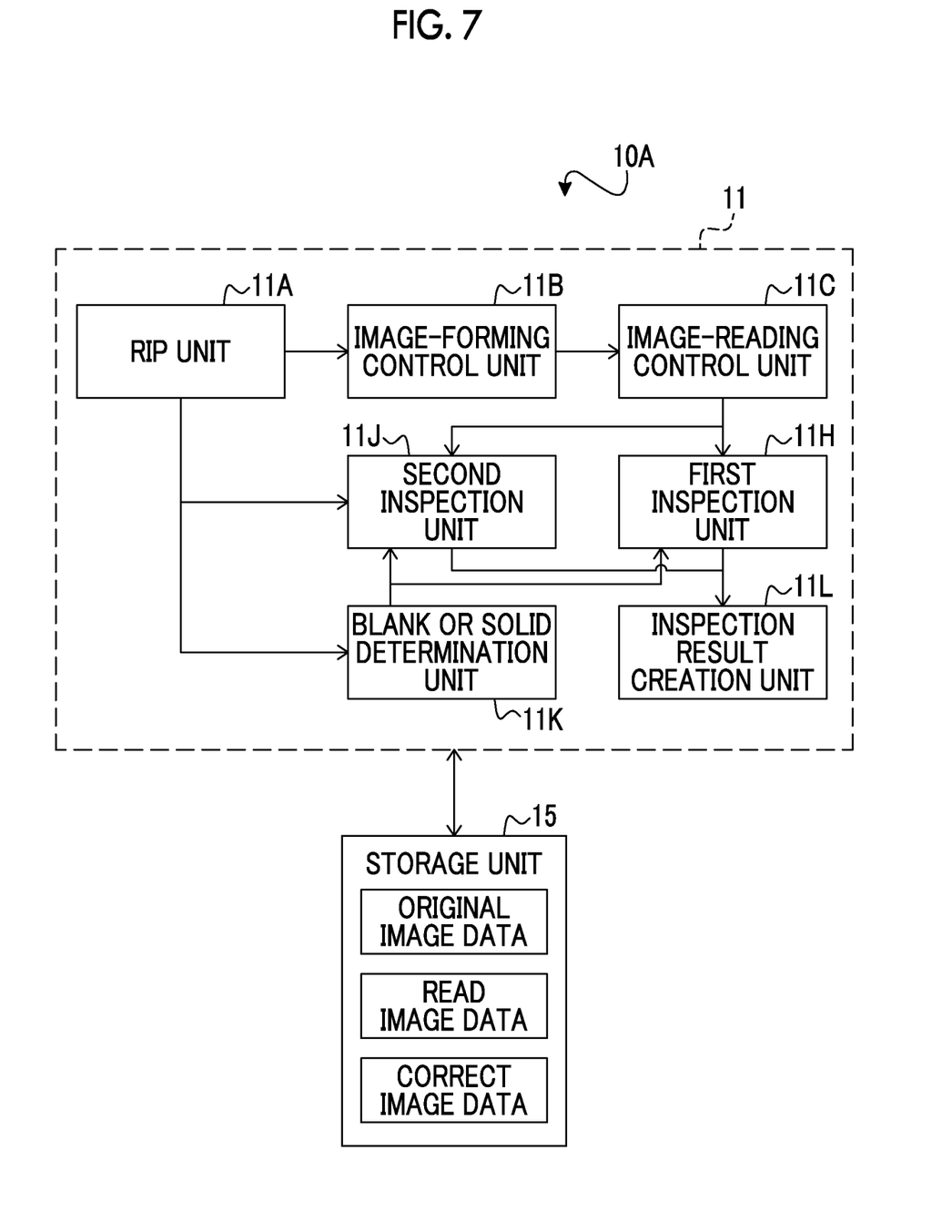
FIG. 7 is a block diagram illustrating an example of a functional configuration of an image forming apparatus according to a second exemplary embodiment.

FIG. 7 is a block diagram illustrating an example of a functional configuration of an image forming apparatus 10A according to the second exemplary embodiment.

As illustrated in FIG. 7, a CPU 11 in the image forming apparatus 10A according to the present exemplary embodiment functions as an RIP unit 11A, an image-forming control unit 11B, an image-reading control unit 11C, a first inspection unit 11H, a second inspection unit 11J, and a blank or solid determination unit 11K, and an inspection result creation unit 11L. The components having the identical functions as the components of the image forming apparatus 10 described in the first exemplary embodiment are denoted by the identical reference signs, and the repetitive description thereof will be omitted.

The blank or solid determination unit 11K generates image structure information from original image data, and inputs the generated image structure information to each of the second inspection unit 11J and the first inspection unit 11H.

The second inspection unit 11J associates the blank portion or the solid portion of the original image data used as the correct image data for the second inspection with a blank portion or a solid portion of read image data as the inspection target, by using the image structure information input from the blank or solid determination unit 11K. The second inspection unit 11J specifies the blank portion or the solid portion of the read image data as the inspection target, and performs the second inspection on the specified blank portion or solid portion.

The first inspection unit 11H uses the image structure information input from the blank or solid determination unit 11K to specify a portion (for example, text portion) other than the blank portion and the solid portion of the read image data set as the inspection target and to perform the first inspection on the specified portion other than the blank portion and the solid portion.

The inspection result creation unit 11L determines the quality of the blank portion or the solid portion by using the inspection result of the second inspection, and determines the quality of the portion other than the blank portion and the solid portion by using the inspection result of the first inspection. The inspection result creation unit creates a final inspection result based on the determination results, and outputs the created inspection result.

Next, the action of the image forming apparatus 10A according to the second exemplary embodiment will be described with reference to FIG. 8.

Figure 8:
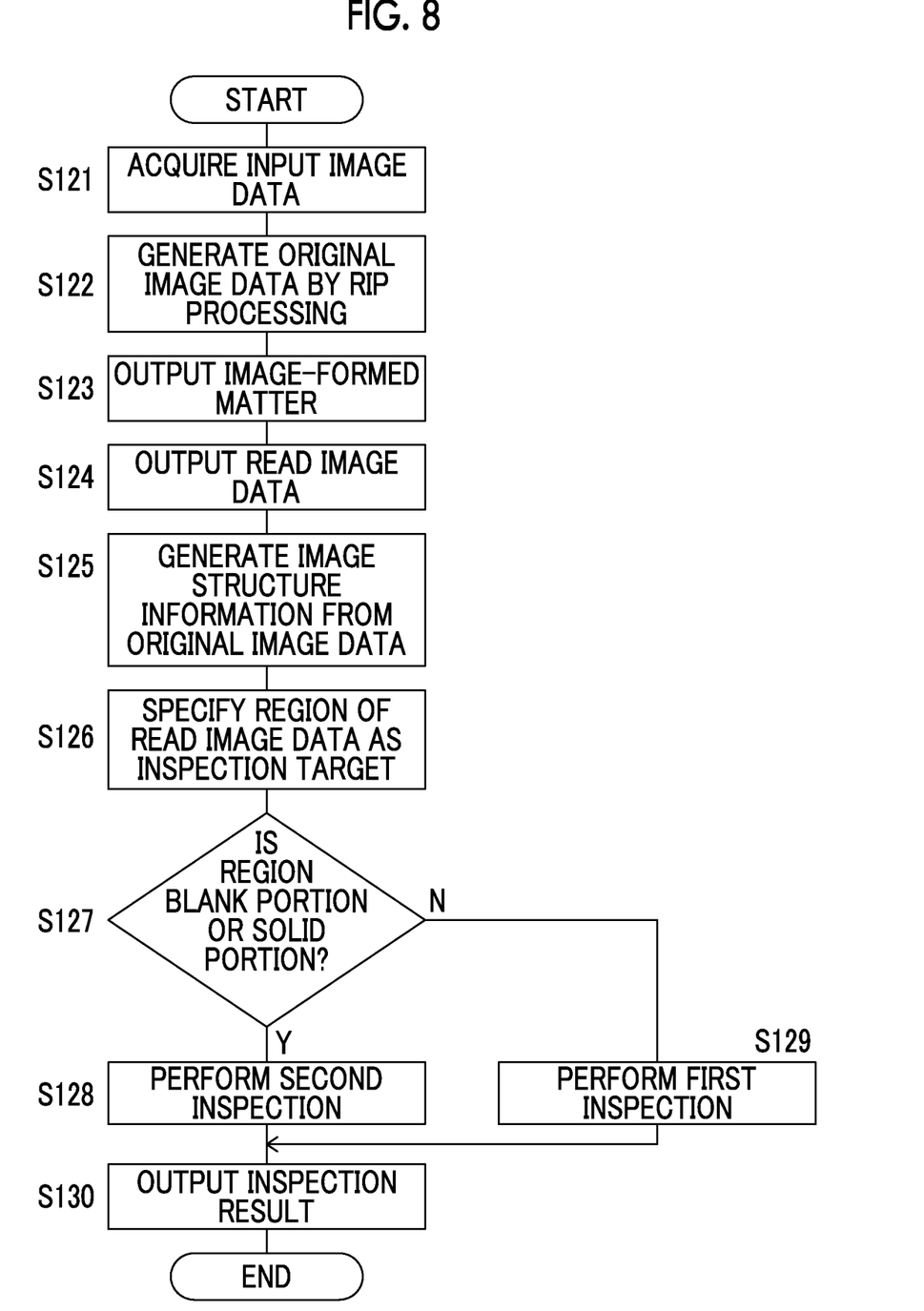
FIG. 8 is a flowchart illustrating an example of a processing flow by an inspection program according to the second exemplary embodiment.

FIG. 8 is a flowchart illustrating an example of a processing flow by an inspection program 15A according to the second exemplary embodiment.

Firstly, in a case where the image forming apparatus 10A is instructed to perform the inspection, the inspection program 15A is started to perform each of the following steps.

In Step S121 in FIG. 8, the CPU 11 acquires input image data from a document reading unit 18 or an external PC.

In Step S122, the CPU 11 performs RIP processing on the input image data acquired in Step S121 to generate original image data. The generated original image data is registered in the storage unit 15. As described above, for example, data (rasterized data) after the RIP processing, bitmap data, and GIF data are applied as the original image data.

In Step S123, the CPU 11 transmits a control signal to the image forming unit 19, and controls the operation of the image forming unit 19 to form the original image data registered in Step S122 on a recording medium and output an image-formed matter. A plurality of recording media may be used, and a plurality of image-formed matters may be output.

In Step S124, the CPU 11 transmits a control signal to the in-line sensor 20, and controls the operation of the in-line sensor 20 to read the image-formed matter output in Step S123, and output the read image data. In a case where a plurality of image-formed matters are provided, a plurality of pieces of read image data are output.

In Step S125, the CPU 11 generates image structure information from the original image data. At this time, the CPU associates the blank portion or the solid portion of the original image data used as the correct image data with the blank portion or the solid portion of the read image data as the inspection target, by using the generated image structure information. In this example, the read image data being the inspection target is not particularly limited, but, in a case where the first read image data is used as the correct image data in the first inspection, the read image data after the first read image data is set as the inspection target.

In Step S126, the CPU 11 specifies a region of the read image data being the inspection target.

In Step S127, the CPU 11 determines whether or not the region specified in Step S126 is the blank portion or the solid portion. In a case where the CPU determines that the specified region is the blank portion or the solid portion (in the case of affirmative determination), the process proceeds to Step S128. In a case where the CPU determines that the specified region is neither the blank portion nor the solid portion, that is, a portion other than the blank portion and the solid portion (in the case of negative determination), the process proceeds to Step S129.

In Step S128, the CPU 11 uses the original image data as the correct image data, and performs the second inspection on the portion other than the blank portion and the solid portion, which is determined in Step S127.

In Step S129, for example, the CPU 11 sets the first read image data as the correct image data, and performs the first inspection on the portion other than the blank portion and the solid portion, which is determined in Step S127.

In Step S130, the CPU 11 outputs the final inspection result for the read image data being the inspection target, based on the inspection result of the second inspection performed in Step S128 and the inspection result of the first inspection performed in Step S129. Then, the CPU ends a series of processes by the inspection program 15A.

As described above, according to the present exemplary embodiment, the second inspection is performed on the blank portion or the solid portion of the read image data being the inspection target, and the first inspection is performed on the portion other than the blank portion and the solid portion. Therefore, the two inspections do not overlap for each region, and thus it is possible to reduce the inspection processing time as compared with the first exemplary embodiment.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Hitherto, the examples of the inspection device and the image forming apparatus according to the exemplary embodiment are described above. The exemplary embodiment may have a form of a program for causing a computer to perform the functions of the units in the inspection device. The exemplary embodiment may have a form of a non-transitory computer readable storing medium that stores the programs.

In addition, the configuration of the inspection device described in the above exemplary embodiment is just an example, and may be changed depending on the situation in a range without departing from the gist.

The processing flow of the program described in the above exemplary embodiment is also just an example. In a range without departing from the gist, unnecessary steps may be deleted, a new step may be added, or the processing order may be changed.

In the above exemplary embodiment, the case where the program is executed, and thereby the processing according to the exemplary embodiments is realized by the software configuration using the computer is described, but the present disclosure is not limited to this. The exemplary embodiment may be realized, for example, by a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection device comprising:
a processor configured to:
use, as correct image data, read image data obtained by reading an image-formed matter obtained by forming original image data on a recording medium; and
in a case where a first inspection of determining quality of read image data as an inspection target is performed using the correct image data, the read image data being obtained by reading a new image-formed matter, perform a second inspection on a blank portion or a solid portion included in the read image data as the inspection target, the second inspection using the original image data as the correct image data.

2. The inspection device according to claim 1, wherein the processor is configured to:
perform both the first inspection and the second inspection on an entirety of the read image data as the inspection target;
determine quality of the blank portion or the solid portion by using an inspection result of the second inspection; and
determine quality of a portion other than the blank portion and the solid portion by using an inspection result of the first inspection.

3. The inspection device according to claim 2, wherein the processor is configured to:
in a case where a result obtained by determining the quality of the blank portion or the solid portion is different from a result obtained by determining the quality of the portion other than the blank portion and the solid portion, display the different determination results as an inspection result of the read image data as the inspection target; and
perform a control of displaying a screen for receiving an input of whether or not a user accepts the inspection result.

4. The inspection device according to claim 3, wherein the processor is configured to:
determine whether or not the original image data includes the blank portion or the solid portion, by using image structure information obtained by analyzing the original image data.

5. The inspection device according to claim 4, wherein the processor is configured to:
in the second inspection, associate a blank portion or a solid portion of the original image data used as the correct image data for the second inspection with the blank portion or the solid portion of the read image data as the inspection target, by using the image structure information.

6. The inspection device according to claim 2, wherein the processor is configured to:
determine whether or not the original image data includes the blank portion or the solid portion, by using image structure information obtained by analyzing the original image data.

7. The inspection device according to claim 6, wherein the processor is configured to:
in the second inspection, associate a blank portion or a solid portion of the original image data used as the correct image data for the second inspection with the blank portion or the solid portion of the read image data as the inspection target, by using the image structure information.

8. The inspection device according to claim 1, wherein the processor is configured to:
perform the second inspection on the blank portion or the solid portion of the read image data as the inspection target;
perform the first inspection on a portion of the read image data as the inspection target other than the blank portion and the solid portion;

determine quality of the blank portion or the solid portion by using an inspection result of the second inspection; and determine quality of the portion other than the blank portion and the solid portion by using an inspection result of the first inspection.

9. The inspection device according to claim 8, wherein the processor is configured to:

in a case where a result obtained by determining the quality of the blank portion or the solid portion is different from a result obtained by determining the quality of the portion other than the blank portion and the solid portion, display the different determination results as an inspection result of the read image data as the inspection target; and perform a control of displaying a screen for receiving an input of whether or not a user accepts the inspection result.

10. The inspection device according to claim 9, wherein the processor is configured to:

determine whether or not the original image data includes the blank portion or the solid portion, by using image structure information obtained by analyzing the original image data.

11. The inspection device according to claim 10, wherein the processor is configured to:

in the second inspection, associate a blank portion or a solid portion of the original image data used as the correct image data for the second inspection with the blank portion or the solid portion of the read image data as the inspection target, by using the image structure information.

12. The inspection device according to claim 8, wherein the processor is configured to:

determine whether or not the original image data includes the blank portion or the solid portion, by using image structure information obtained by analyzing the original image data.

13. The inspection device according to claim 12, wherein the processor is configured to:

in the second inspection, associate a blank portion or a solid portion of the original image data used as the correct image data for the second inspection with the blank portion or the solid portion of the read image data as the inspection target, by using the image structure information.

14. The inspection device according to claim 1, wherein the processor is configured to:

determine whether or not the original image data includes the blank portion or the solid portion, by using image structure information obtained by analyzing the original image data.

15. The inspection device according to claim 14, wherein the processor is configured to:

in the second inspection, associate a blank portion or a solid portion of the original image data used as the correct image data for the second inspection with the blank portion or the solid portion of the read image data as the inspection target, by using the image structure information.

16. An image forming apparatus comprising:

a forming unit that forms original image data on a recording medium;

a reading unit that reads an image-formed matter obtained by formation of the forming unit; and an inspection device that includes a processor configured to:

use, as correct image data, read image data obtained by reading of the reading unit; and in a case where a first inspection of determining quality of read image data as an inspection target is performed using the correct image data, the read image data being obtained by the reading unit reading a new image-formed matter, perform a second inspection on a blank portion or a solid portion included in the read image data as the inspection target, the second inspection using the original image data as the correct image data.

17. A non-transitory computer readable medium storing an inspection program causing a computer to execute:

using, as correct image data, read image data obtained by reading an image-formed matter obtained by forming original image data on a recording medium; and in a case where a first inspection of determining quality of read image data as an inspection target is performed using the correct image data, the read image data being obtained by reading a new image-formed matter, performing a second inspection on a blank portion or a solid portion included in the read image data as the inspection target, the second inspection using the original image data as the correct image data.

* * * * *